United States Patent Office 3,464,980
Patented Sept. 2, 1969

3,464,980
16α,17α,21-CYCLIC ORTHOESTERS OF STEROIDS
Robert Bruce Brownfield, Nanuet, N.Y., assignor to American Cyanamid Company, Stamford, Conn., a corporation of Maine
No Drawing. Filed Dec. 14, 1966, Ser. No. 601,565
Int. Cl. C07c 169/34, 173/00
U.S. Cl. 260—239.55  6 Claims

ABSTRACT OF THE DISCLOSURE

This invention describes novel cyclic orthoesters of steroids of the pregnane series. These esters are formed from 16α,17α,21-trihydroxy-20-keto pregnanes. The products are useful as intermediates for the preparation of other steroids wherein it is desirable to block the 16α,17α,21-positions. The present compounds also have anti-inflammatory activity.

---

A number of intermediates found useful in the preparation of the compounds of the present invention are described in my copending application Ser. No. 576,560, filed Sept. 1, 1966, now abandoned.

The compounds of the present invention may be illustrated by the following formula:

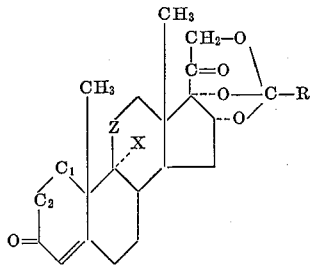

wherein R is hydrogen, or lower alkyl; X is hydrogen or halogen;

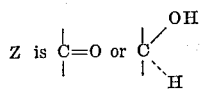

and $C_1$–$C_2$ is —$CH_2$—$CH_2$— or —$CH$=$CH$—.

The present compounds are in general crystalline solids having a definite melting point. They are substantially insoluble in water but soluble in the usual organic solvents such as benzene, toluene, acetone, etc.

These cyclic orthoesters are herein generically designated 16α,17α,21 - alkylidenetrioxy - 20 - keto pregnanes. They may be prepared by using one of the methods described by the partial structures in the following flowsheet and in the subsequent description:

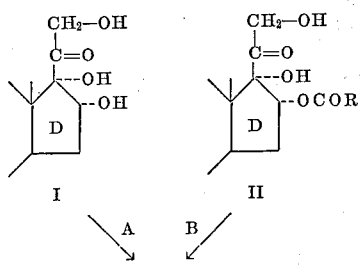

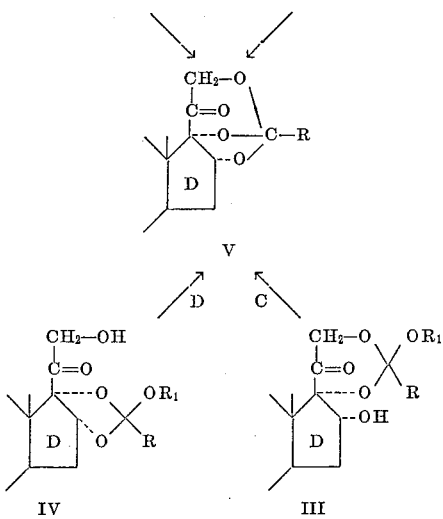

wherein R is as hereinbefore defined and $R_1$ is lower alkyl.

Method A.—In this process for the preparation of the novel, 16α,17α,21 - alkylidenetrioxy - 20 - keto pregnanes (V), 16α,17α,21-trihydroxy-20-pregnanes (I) are suspended in an inert solvent, preferably dioxane, containing an excess of a trialkyl orthoester [$(R_1O)_3CR$]. The stirred suspension is treated at ambient temperature with an acid catalyst, typically concentrated sulfuric acid. The reaction is allowed to proceed, evidenced by clearing (about two minutes) and progressive discoloration (colorless to amber) for a short period, typically six minutes, and is then quenched by neutralization of the acid catalyst with pyridine. The reaction solution is evaporated and the crude product is separated by conventional chromatographic procedures into its component parts, the known 21 - hydroxy - 16α,17α - alkoxyalkylidenedioxy - 20 - keto pregnanes (IV) and the novel 16α,17α,21-alkylidenetrioxy-20-keto-pregnanes (V).

Method B.—In this process for the preparation of the novel 16α,17α,21 - alkylidenetrioxy - 20 - keto - pregnanes (V), 16α-alkanoyloxy - 17α,21 - dihydroxy-20-keto-pregnanes (II) are suspended in an inert solvent, typically dry benzene, containing a trace of acid catalyst, typically p-toluenesulfonic acid, and the mixture is distilled slowly for a period of from one to four hours. The reaction solution is stabilized by the addition of a small amount of pyridine, evaporated and the product is crystallized from acetone/n-hexane or similar inert and neutral organic solvents. The starting materials according to the process of Method B, 16α-alkanoylovy-17α,21-dihydroxy-20-keto-pregnanes (II), are readily prepared from the parent triols as disclosed in the examples hereinafter or described in application Serial No. 576,560, referred to above.

Method C.—A third method for the preparation of the novel invention compounds utilizes 16α-hydroxy-17α, 21-alkoxyalkylidenedioxy-20-keto pregnanes (III) as starting materials. These latter may be prepared in high yields in a three step process from the parent triols (I). The latter are converted via the 16α-alkanoyloxy-17α-21-dihydroxy-20-keto pregnanes (II) to 16α-alkanoyloxy-17α,21-alkoxyalkylidenedioxy-20-keto pregnanes according to the process described in my copending application Serial No. 576,560, filed Sept. 1, 1966, or alternatively according to Ercoli et al. U.S. Patent 3,147,249. In the third step, the 16α-alkanoyloxy-17α,21-alkoxyalkylidene-dioxy-20-keto pregnanes are hydrolyzed with alkali to give the 16α-hydroxy-17α,21-alkoxyalkylidenedioxy-20-keto pregnanes (III), (according to Ercoli et al. U.S. Patent 3,147,249). The latter alkaline hydrolysis is carried out in aqueous alcohols and a variety of bases are useful. Typically the reaction is conducted at room temperature in aqueous methanol using sodium hydroxide or potassium carbonate and is complete in from one-half to three hours.

The compounds (III) are converted to the invention compounds (V) by a procedure identical with that described in Method B (above). Typically the 16α-hydroxy-17α,21-alkoxyalkylidenedioxy-20-keto pregnanes (III) are suspended in dry benzene containing a trace of p-toluene-sulfonic acid and the mixture is distilled slowly over a period of from one to four hours. The mixture is stabilized by the addition of a slight excess of pyridine and the solvent is removed by evaporation. The product is isolated and purified in the usual way, typically by recrystalliaztion.

Method D.—A fourth method for the preparation of the invention compounds (V) utilizes 21-hydroxy-16α,17α-alkoxyalkylidenedioxy-20-keto pregnanes (IV) as starting materials. The latter compounds may be conveniently prepared according to Smith et al. U.S. Patent 2,966,486. The reaction conditions under which these compounds (IV) are converted to the novel compounds (V) are identical to those used in Methods B and C above.

Utilizing the above methods, as described in the appended examples, virtually any 16α,17α,21-trihydroxy-20-keto pregnane, may be used as the starting material to produce the novel 16α,17α,21-alkylidenetrioxy-20-keto pregnanes of this invention.

The novel steroids of this invention may be prepared, for instance, from such starting materials as:

4-pregnene-16α,17α,21-triol-3,20-dione,
4-pregnene-11β,16α,17α,21-tetrol-3,20-dione,
4-pregnene-17β,16α,17α-21-tetrol-3,20-dione,
4-pregnene-16α,17α,21-triol-3,11,20-trione,
1,4-pregnadiene-11β,16α,17α,21-tetrol-3,20-dione,
4,6-pregnadiene-16α,17α,21-triol-3,11,20-trione,
1-pregnene-16α,17α,21-triol-3,11,20-trione,
4α-chloro-5α-pregnane-16α,17α,21-triol-3,20-dione,
4α-bromo-5α-pregnane-16α,17α,21-triol-3,20-dione,
3β-ethoxy-5α-pregnane-16α,17α,21-triol-20-one,
5-pregnene-3β,16α,17α,21-tetrol-20-one-3-benzoate,
5α-pregnane-16α,17α,21-triol-3,11,20-trione,
5α-pregnane-11β,16α,17α,21-tetrol-3,20-dione,
4,9(11)-pregnadiene-16α,17α,21-triol-3,20-dione.

Among the examples of trialkyl orthoesters, useable in preparing the derivatives of this invention, are the available trialkyl esters of the following ortho acids: ortho-acetic, ortho-propionic, ortho-butyric, ortho-isobutyric, ortho-valeric, ortho-iso-valeric, ortho-caproic, ortho-oenanthic, ortho-caprylic, ortho-pelargonic, ortho-capric, ortho-hexahydrobenzoic, ortho-benzoic, ortho-β-phenyl-propionic, ortho-β-carbotheoxypropionic, and ortho- formic.

The invention compounds are extremely reactive to acids giving 16-esters instantaneously, but are stable to alkali. This differential behavior to acids and bases, forms the basis of the chemical utility of this noval derivative type. For example, while the D-ring and side chain are protected as the 16α,17α,21-cyclic orthoester, reactions in neutral or alkaline media may be conducted at another site in the molecule after which vigorous treatment, the sensitive ring D, side chain configuration may be regenerated by mild acid treatment. For example, the 16α,17α, 21-triol (1) may be converted (as shown in the partial formulas).

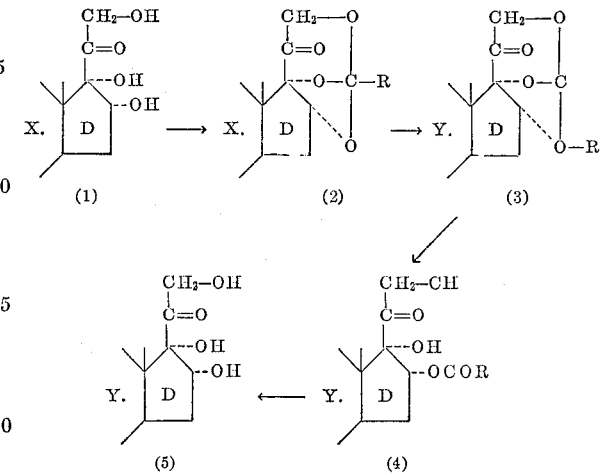

to the 16,17,21-cyclic orthoester (2) by any one of the methods described herein. The compounds (2) may then be reacted under neutral or alkaline conditions to bring about the change X→Y producing compounds (3) (an obvious example being 11β-OH→11-keto). Mild acid treatment yields compounds (4). Mild alkali treatment of compounds (4) furnishes compounds (5). The direct X→Y conversion (oxidation noted), i.e., (1)→(5), is obviously not possible since serious degradation of the D-ring and side chain would also take place.

The invention compounds are also useful per se since they exhibit topical and systemic anti-inflammatory activities.

Generally, the novel steroids of this invention may be prepared by at least one of the methods described above, and possibly all. Most of the following examples, for instance, describe the preparation of a specific product utilizing more than one of these methods. All four methods are exemplified. The best method for the preparation of a specific steroid is selected on the basis of best yield of final product.

EXAMPLE I

Preparation of 9α-fluoro-11β-hydroxy-16α,17α,21-(1-pentylidenetrioxy)-1,4-pregnadiene-3,20-dione (a) Method A.—Triamcinolone, 1.0 g. is suspended with stirring in dioxane (10.0 ml.) containing trimethyl orthovalerate (1.0 ml.). Concentrated sulfuric acid (0.02 ml.) is added to the stirred suspension and within two minutes complete solution occurs. During the next four minutes the initial yellow color deepens to amber. At this point (reaction time six minutes) the reaction is quenched by the addition of pyridine (0.06 ml.) whereupon the light yellow color is restored. The solvent is removed under reduced pressure, pyridine is added and the evaporation is repeated. The residual oil is dissolved in a small volume of acetone and the concentrate is applied to thick layers (0.75 mm.) of silica gel for chromatographic resolution according to the technique known as preparative thin layer chromatography. The plates are developed several times with the solvent system methanol-chloroform (1:160). The leading zone from each of the several plates is removed and eluted with acetone. The solution obtained from the combined eluates is concentrated and rechromatographed in the manner just described and there is obtained an oil which crystallizes spontaneously. Recrystallization from acetone/n-hexane affords an analytical specimen of triamcinolone-16,17,21-cyclic orthovalerate, melting point 208–212° C. (with previous softening from 186° C.); $[\alpha]_D^{25} +111°$ (CHCl$_3$);

$\lambda_{max}^{MeOH}$ 239 m$\mu$ ε 14,800

(b) Method B.—Triamcinolone-16-valerate, 1.0 g. is suspended in dry benzene (125 ml.) and a trace (ca. 10 mg.) of p-toluenesulfonic acid is added. The mixture is heated to the reflux temperature and the volume of the reaction mixture is reduced by very slow distillation of the benzene solvent. The suspension clears after about two hours and at the end of four hours reaction time, pyridine (0.5 ml.) is added to neutralize the acid catalyst. The quenched reaction solution is evaporated under reduced pressure and the residue is crystallized by trituration with acetone/n-hexane giving 1.05 g. triamcinolone-16,17,21-cyclic orthovalerate.

(c) Method C.—Benzene (20 ml.) containing 2–3 mg. p-toluenesulfonic acid is refluxed for one hour, in a round-bottomed flask fitted with a Dean-Stark type receiver topped with an upright condenser and a calcium sulfate drying tube. Triamcinolone-17,21-cyclic methyl orthovalerate (100 mg.) is introduced and refluxing is continued for six hours. Pyridine (two drops) is added, a small amount (6 mg.) of solid is removed by filtration and the filtrate is evaporated. The residual oil is crystallized from acetone/n-hexane and the product, triamcinolone-16,17,21-cyclic orthovalerate, is further purified by recrystallization from the same solvent.

EXAMPLE II

Preparation of 9α-fluoro-11β-hydroxy-16α,17α,21-methylenetrioxy-1,4-pregnadiene 3,20-dione (a) Method A.—The procedure according to Example Ia is followed exactly with the exception that trimethyl orthoformate is used in place of trimethyl orthovalerate. The object triamcinolone-16,17,21-cyclic orthoformate is separated from the accompanying, undesired and more polar triamcinolone-16,17-cyclic methyl orthoformate using standard chromatographic procedures and is then further purified by crystallization from acetone/n-hexane, melting point 217.5–218.5° C.; $[\alpha]_D^{25} +100°$ (CHCl$_3$);

$$\lambda_{max.}^{MeOH} 238 \text{ m}\mu \ \epsilon \ 15,200$$

(b) Method B.—The procedure according to Example Ib is followed exactly with the exception that triamcinolone-16-formate (prepared from the starting material of Example II–D, according to the process described by Dusza et al. J. Org. Chem. 27 4677 (1952)), is used in place of triamcinolone-16-valerate. The object triamcinolone-16,17,21-cyclic orthoformate is isolated by evaporation of the pyridine-quenched reaction mixture and crystallization of the residue with acetone/n-hexane.

(d) Method D.—9α-fluoro-11β,21-dihydroxy-16α,17α-methoxymethylenedioxy-1,4-pregnadiene-3,20-dione, 2.50 g., is suspended with stirring in 500 ml. dry benzene containing approximately 15 mg. p-toluene-sulfonic acid. The mixture is heated to the boiling point and then distilled slowly for 5.5 hours during which time, 400 ml. of distillate is collected. The hot reaction suspension is filtered and the solid so removed (700 mg. triamcinolone-16-formate) is washed with dry benzene. The combined filtrate and washes are stored at 5° C. overnight after which the crystalline solid is removed by filtration, washed well with dry benzene and air dried, 1.30 g. triamcinolone-16,17,21-cyclic orthoformate. An additional 345 mg. of the product is obtained by evaporation of the mother liquors. Removal from these products of a trace of contaminating triamcinolone-16-formate is accomplished by chromatographing on a thick (0.75 mm.) layer of silica gel with the solvent system chloroform/methanol/benzene (5:1:2). The least polar band is removed, eluted with acetone and the solute therein is crystallized from acetone/n-hexane to give pure triamcinolone-16,17,21-cyclic orthoformate.

EXAMPLE III

Preparation of 9α-fluoro-11β-hydroxy-16α,17α,21-ethylidenetrioxy 1,4-pregnadiene-3,20-dione (a) Method A.—The procedure according to Example Ia is repeated exactly with the exception that triethyl orthoacetate is used in place of trimethyl orthovalerate. The desired triamcinolone-16,17,21-cyclic orthoacetate is separated from accompanying triamcinolone-16,17-cyclic ethyl orthoacetate using conventional chromatographic techniques.

(b) Method B.—Triamcinolone, 10.0 g., is suspended with stirring in dioxane (100 ml.) containing triethyl orthoacetate (10.0 ml.) and methanol (0.4 ml.) and the reaction is initiated by the addition of 0.20 ml. concentrated sulfuric acid. Solution occurs within two minutes and after a total reaction time of six minutes, the reaction is quenched by the addition of pyridine (0.60 ml.). The quenched reaction solution is then poured into a stirred solution composed of methanol (400 ml.) and dilute hydrochloric acid (100 ml.) and the hydrolysis is allowed to proceed at room temperature for one-half hour. The reaction solution is concentrated to a small volume, under reduced pressure. The concentrate is diluted with water and the precipitated product is removed by filtration, washed well with water, then air dried. The sample for analysis is obtained by recrystallization from aqueous methanol then acetone/n-hexane. The triamcinolone-16-acetate has a melting point 214–216° C.

By substituting triamcinolone-16-acetate prepared above for triamcinolone-16-valerate and carrying out the reaction exactly as described in Example Ib the compound triamcinolone 16,17,21-cyclic orthoacetate is obtained in high yield, melting point 228.0–228.5° C.; $[\alpha]_D^{25}$ 110° C. (CHCl$_3$)

$$\lambda_{max.}^{MeOH} 238 \text{ m}\mu \ \epsilon \ 15,100$$

EXAMPLE IV

Preparation of 11β-hydroxy-16α,17α,21-ethylidenetrioxy-4-pregnene-3,20-dione (a) Method A.—The procedure according to claim Ia is repeated exactly with the exception that 16α-hydroxycortisol is used in place of triamcinolone and triethyl orthoacetate is used in place of trimethyl orthovalerate. The object compound is separated from the accompanying, undesired and more polar 16α-hydroxycortisol-16, 17-cyclic ethyl orthoacetate using the usual chromatographic procedures. Purification is accomplished through recrystallization from acetone/n-hexane, melting point 197.5–199° C.; $[\alpha]_D^{25}$ +109° (CHCl$_3$);

$$\lambda_{max.}^{MeOH} 241 \text{ m}\mu \ \epsilon \ 16,700$$

(b) Method B.—16α-acetoxycortisol is substituted for triamcinolone-16-valerate and the procedure according to Example Ib is followed exactly giving 11β-hydroxy-16α,17α,21-ethylidenetrioxy-4-pregnene-3,20-dione.

EXAMPLE V

Preparation of 9α-fluoro-16α,17α,21-ethylidenetrioxy-1,4-pregnadiene-3,11,20-trione A cold solution of 9α-fluoro-11β-hydroxy-16α,17a,21-ethylidenetrioxy-1,4-pregnadiene-3,20-dione (500 mg.) in pyridine (5 ml.) is added to a stirred, room temperature suspension of chromium trioxide (500 mg.) in pyridine (7 ml.). The amber mixture is allowed to stand at room temperature for 22 hours then quenched by the addition of water. The mixture is stirred at room temperature for one-half hour with 10 ml. sodium sulfite solution (10%) then poured over ice. The product is extracted into ethyl acetate and the extract is washed, dried (magnesium sulfate) and evaporated to give 350 mg. of crude product. The analytical specimen is obtained by recrystallization from acetone/n-hexane; melting point 237.5–238.0° C.; [α]$_D^{25}$ +175° (CHCl$_3$);

$\lambda_{max.}^{MeOH}$ 236 m$\mu$ ϵ 14,500)

EXAMPLE VI

Preparation of 9α-fluoro-16α,17α,21-trihydroxy-1,4-pregnadiene-3,11,20-trione

The product of Example V, 50 mg. is dissolved in acetone (8 ml.) and the solution is treated with three drops of 1 N hydrochloric acid solution. The reaction solution is stirred at ambient temperature for 2½ hours then evaporated under reduced pressure. Trituration of the residue with water gives a solid which is collected by filtration, washed well with water, and dried and crystallized from acetone/n-hexane; 9α-fluoro-17α,21-dihydroxy-16α-acetoxy-1,4-pregnadiene-3,11-20-trione, melting point 195.5°–196.5° C.

The latter compound, 40 mg. is dissolved in methanol (5 ml.) and the solution is treated at room temperature and under nitrogen with 10% potassium carbonate solution (0.15 ml.) for 30 minutes. The reaction solution is carefully neutralized by dropwise addition of glacial acetic acid then concentrated to a small volume (ca. 0.5 ml.) under reduced pressure. Addition of saturated saline solution causes crystalline solid to separate. The latter is separated by filtration, washed well with water and dried; 9α-fluoro-16α,17α,21-trihydroxy-1,4-pregnadiene-3,11,20-trione, melting point 213°–215° C. is obtained.

What is claimed is:

1. An alkylidenetrioxy pregnane of the formula:

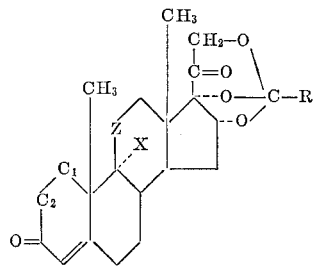

wherein R is selected from the group consisting of hydrogen and lower alkyl; X is selected from the group consisting of hydrogen and fluorine; Z is selected from the group consisting of >C=O and

and C$_1$–C$_2$ is selected from the group consisting of —CH$_2$—CH$_2$— and —CH=CH—.

2. The alkylidenetrioxy pregnane according to claim 1: 9α-fluoro-11β-hydroxy-16α,17α,21-methylenetrioxy-1,4-pregnadiene-3,20-dione.

3. The alkylidenetrioxy pregnane according to claim 1: 9α-fluoro-11β-hydroxy-16α,17α,21-(1-pentylidenetrioxy)-1,4-pregnadiene-3,20-dione.

4. The alkylidenetrioxy pregnane according to claim 1: 9α-fluoro-11β-hydroxy-16α,17α,21-ethylidenetrioxy-1,4-pregnadiene-3,20-dione.

5. The alkylidenetrioxy pregnane according to claim 1: 11β-hydroxy-16α,17α,21-ethylidenetrioxy-4-pregnene-3,20-dione.

6. The alkylidenetrioxy pregnane according to claim 1: 9α-fluoro-16α,17α,21-ethylidenetrioxy-1,4-pregnadiene-3,11,20-trione.

References Cited

UNITED STATES PATENTS 3,139,427  6/1964  Heller et al. _____ 260—239.55

OTHER REFERENCES

Brown et al., Journ. Org. Chem., vol 26, December 1961, pp. 5033–5036.

LEWIS GOTTS, Primary Examiner

ETHEL G. LOVE, Assistant Examiner

U.S. Cl. X.R.

260—397.45, 397.47, 999